June 11, 1968 S. BARBIERI 3,387,534
AUTOMATIC FOCUSING DEVICE
Filed Sept. 30, 1965 2 Sheets-Sheet 2
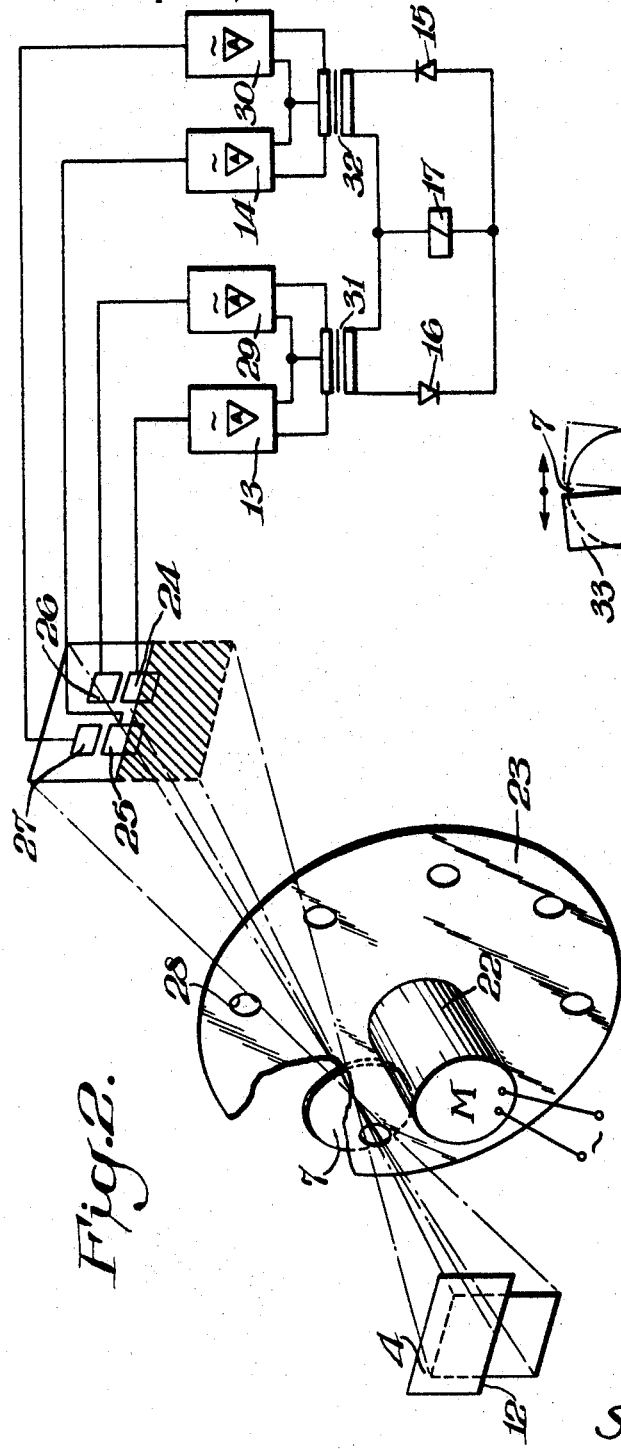
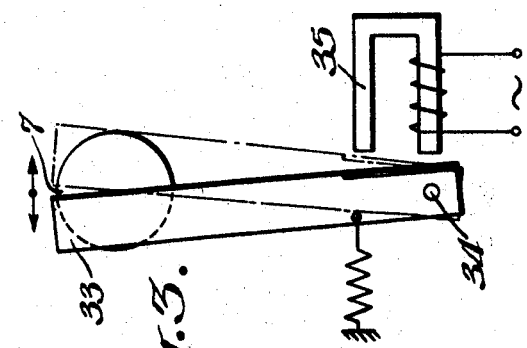
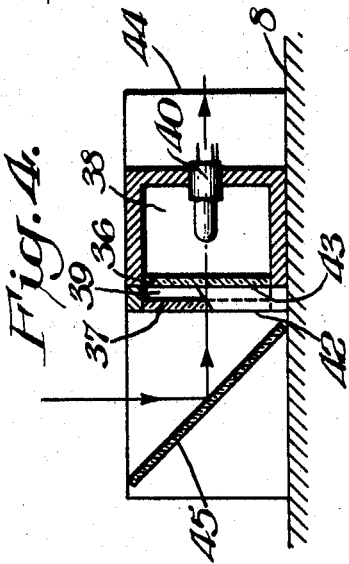
INVENTOR
Siegfried Barbieri
BY Connolly and Hutz
ATTORNEYS

United States Patent Office 3,387,534
Patented June 11, 1968

3,387,534
AUTOMATIC FOCUSING DEVICE
Siegfried Barbieri, Bressanone, near Balzano, Italy, assignor to Durst A.G.
Filed Sept. 30, 1965, Ser. No. 491,663
Claims priority, application Italy, May 12, 1965, 10,540/65
10 Claims. (Cl. 88—24)

This invention relates to an electronic automatic focusing device for optical systems, and more particularly to such a device which is used in connection with photographic enlargers.

Devices for the electronic sharp focusing of image-forming optical systems with any time of exposure are known. In one such system the image is split up into strips by means of a grid; their contrast being the largest when the grid lies in the focal field. If the grid is oscillated, alternating current can be produced in a photoelectric cell and the contrast can thus be measured, the maximum value of which is used for automatic sharp focusing. Another known focusing system consists of two scan-shaped test images arranged in front of and behind the focusing plane, which are alternatingly exposed to a photoelectric part by means of an apertured stop member.

Yet another known method works in such a manner that the image-forming path of rays is completely screened out by projection of a test-mark on a negative of the same, where the projection is sharp. The light, which is not screened out when there is not sharp focusing is observed by means of a photoelectric device and according to it the sharp focusing is made manually.

It is also known to arrange two photoelectronic structural elements with non-linear characteristics of the same distance, above and under the focusing plane, with the elements being connected to feed control elements that are responsive to their conductivity and have the same conductivity, if the image of a scan-shaped test pattern assembles in one focus with the projection plane.

Examples of prior devices are found in German Patents 1,173,327; 1,103,050; 961,767; 927,239; 742,220; and 709,954, as well as Swiss Patent 310,521 and in "Naturwissenschaftliche Rundschaw" (Scientific Review), vol. 9 (1956), No. 2, pp. 68–69, and in U.S. Patents 3,037,423 and 2,968,994.

An object of this invention is to provide an effective electronic automatic focusing device which is particularly suitable for photographic enlargers.

According to this invention the sharp focusing of the optical system results by the fact that a small apertured partition reciprocates back and forth in the optical path within direct distance of the image-forming objective lens and the pattern window is half shut whereby the edge of the occultation field is normal to the movement direction of the partition or diaphragm and is imaged on the projection plane. The image of the test edge moves with the apertured partition and settles only if the focal plane and the projection plane are in focus. The focusing is automatically accomplished by a photoelectronic structural element which is arranged in the projection plane, and is periodically illuminated by the silhouette of the test edge in accordance with the rhythm of the partition movement. This periodic illumination creates alternating current in the photoelectronic element, which current is reduced to zero when the image has settled upon proper focusing. The increased photoelectric current is utilized to move either the objective lens, or the pattern carrier, or the projection plane, by means for example of a servo-motor, along the optical axis until the focus is obtained whereupon the photoelectric current discontinues when reduced to zero. For the adjustment of the required displacement-direction, two photoelectronic structural elements are arranged, in a conventional manner at the same distance with respect to the projection plane. For example one element is under and the other is over the projection plane. The currents of the elements are utilized along with various other electronic components, whereby the adjusting motor is turned off as soon as the two photoelectric currents both have the same intensity.

The action or movement of the apertured partition may be obtained by setting it into oscillation by the aid of electromagnets, or it may be replaced by a rotating apertured disk which is operated by a motor. It is also possible to use an opaque tongue instead of an apertured partition which, when oscillating normal to the test edge near the objective, occults first one-half of the objective lens aperture, and then the other. The light modulation which is created at the same time by the rotating apertured disk and the oscillating tongue, and which is due to the change of the active diameter of diaphragm, may be compensated for by a photocell which is arranged in the bright image-field.

The diaphragm-moving frequency may be chosen in such a way that it can be filtered in a simple manner from the electric frequency, since the photocells also register the operating frequency of the lamp which lightens the pattern, and it thus would otherwise be disturbing to the control agent. The apertured disk is considered the best device for this purpose as the frequency can be adjusted by the quantity of the apertures in the disk.

Novel features and advantages of the present invention will become apparent to one skilled in the art from a reading of the following description in conjunction with the accompanying drawings wherein similar reference characters refer to similar parts and in which:

FIGURE 2 is a schematic view of a rotating aperture disk actuated by a synchronometer serving the image deflector.

FIGURE 3 is a schematic view of the image deflector in the form of an opaque tongue.

FIGURE 4 shows the arrangement of a measuring top to be placed on the projection plane during the sharp focusing.

Figure 1:
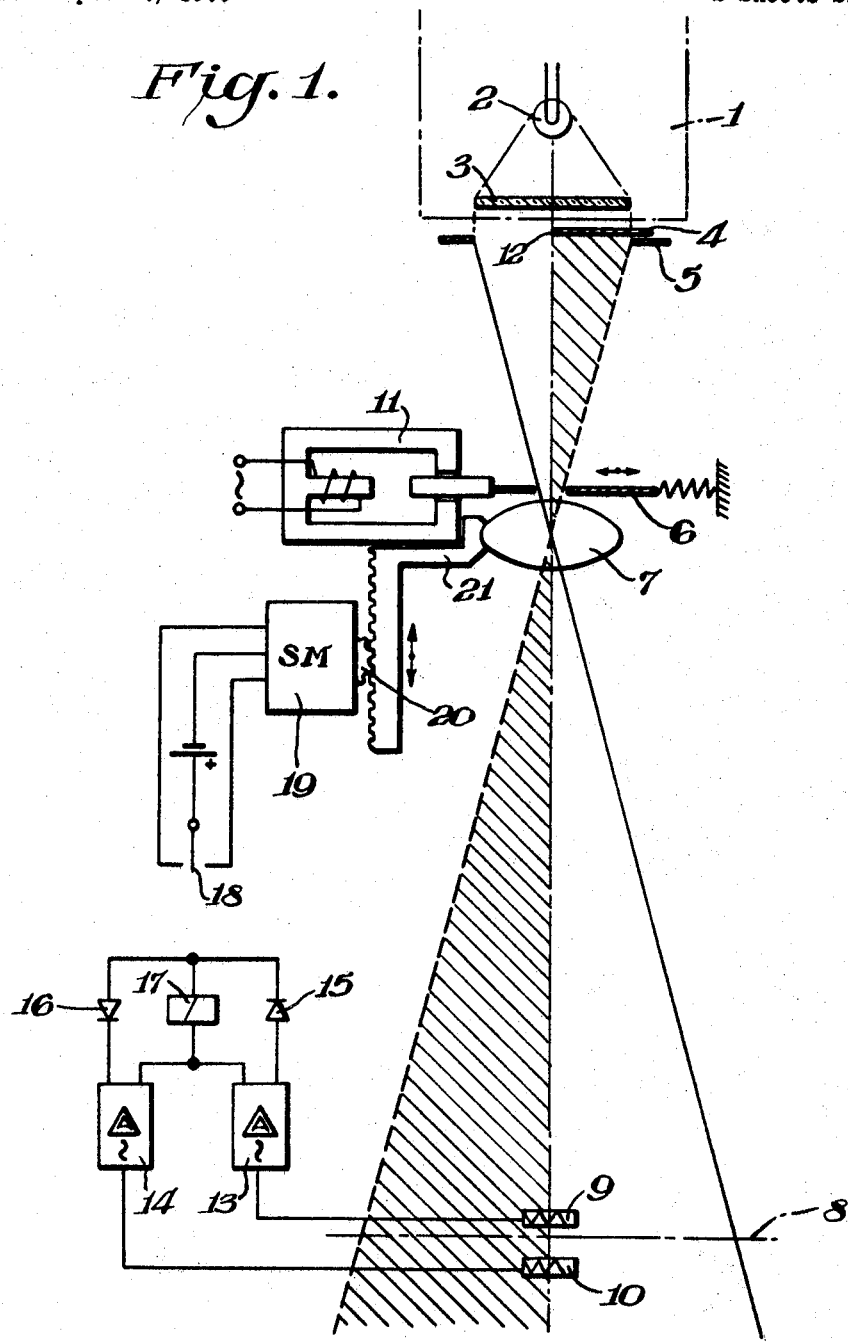
FIGURE 1 is a schematic view of an automatic focusing device having an oscillation diaphragm and an adjustable objective.

In FIG. 1 the lighting system is indicated at 1 and includes, for example, a lamp 2 and an opal disk or lens 3. The light coming diffusely from the opal disk 3 reaches the test pattern or plate 4, which occults half of the shutter 5 and allows only the other half of the light rays to pass. The passing light rays are then projeced through the oscillation diapragm 6, the objective 7 and on to the projection plane 8 where they illuminate one-half of the photocells 9 and 10. Photocells 9 and 10 are arranged the same distance before and behind projection plane 8. The photocells 9 and 10 are spatially arranged in such a way that, although one lies above and the other under the projection plane 8, the cell 9 does not cover the cell 10 which lies further behind.

The oscillation diaphragm 6 is set into oscillation perpendicularly or normally to the test edge 12 by the magnet 11 which is supplied with alternating current. As a result, the projected image of the test pattern 4 more or less illuminates the photocells in an even rhythm. This, in turn, creates an alternating current in the photo cells, which increases with the increasing distance of the focal plane to the projection plane. The alternating current becomes zero if the focal plane and projection plane exactly assemble in one focus or are in focus.

The photo-alternating currents are amplified in the amplifiers 13 and 14, rectified by converters 15 and 16, and conducted with opposite polarity through the poled relay 17 which turns on the control or servo motor 19 (SM) by means of the contact 18 if it is energized and if the two currents have a different intensity. This control motor 19 operates its drive gear 20 which meshes with a rack to move the objective support 21. Objective support 21 is continued to be moved until the focal plane is assembled in one focus with the projection plane 8, in which the two photo cells 9 and 10 deliver the same alternating-current voltage and the relay 17 is released thereby achieving an automatic focusing.

In FIG. 2 the rotating aperture disk 23 which is actuated by the synchronomotor 22, serves for the image deflection. The test pattern 4 is thereby projected with the objective 7 on the photocells 24 and 25 through the passing apertures 28, whereby the image of the test edge 12 occults approximately half of the photo cells 24 and 25.

As a light modulation takes place at objective 7 during the passing of the aperture 28, on which the photocells react heavier than on the desired effect, two other photo cells 26 and 27, respectively, are added to each photocell. These photocells 26 and 27 are located completely in the illuminated image field and are thus not affected by the image occultation. Photo cells 26 and 27 may be considered as compensation cells. The currents of these so called compensation cells are also amplified in the amplifiers 29 and 30 and are inphase-opposed to the currents of the photo cells 24 and 25 conducted to the symmetrical transformers 31 and 32, where they outweigh each other. The information signal is, as in the embodiment of FIG. 1, rectified and conducted to a poled relay 17 which moves the objective along the optical axis in, for example, the manner described above.

The oscillating diaphragm may be built in the form of a multi-apertured disk which is placed in the diaphragm plane of objective 7. The diameters of the apertures progressively increase similar to a photographic diaphragm row. The disk is provided with notches to assure that the manually selected aperture remains exactly concentric to the optical axis while printing, and is oscillated by an electromagnet around the chose medium normal position during the focusing.

In FIG. 3 the image deflector is in the form of an opaque tongue 33 which pivots at 34. Tongue 33 is set into oscillation in such a manner by the alternating-current charged electromagnet 35 that it first occults one-half of the objective 7 and then the other.

FIG. 4 shows the arrangement of a measuring top 44 which is placed, during the sharp focusing, on the projection plane. In this arrangement the light rays are deflected 90° from the surface mirror 45, and then penetrate through the opal disks or lens 36 and 37 to the illumination chambers 38 and 39 where they meet on the photoelectronic structural element 40 and another photoelectronic element which is not shown. Every photoelectronic structural element can be used in this arrangement, no matter which shape the photo-sensitive field has, since the aperture fields 42 and 43 in the illumination chambers are actually the important planes of the measuring.

What is claimed is:
1. An automatic focusing device for optical systems, said device including a pattern carrier, an objective lens, a projection plane, light means for illuminating the pattern on the projection plane through said objective lens, a shutter adjacent said pattern carrier, means for occulting a portion of said shutter whereby a portion of said projection plane is illuminated and a portion of said projection plane is non-illuminated, photo cell means at least partially in said illuminated portion of said projection plane, means for intermittently interrupting the path of light from said light means for creating a current in said photocell means when said system is out of focus, and means responsive to said current for moving one of said pattern carrier, objective lens and projection plane until a sharp focusing is achieved when said current is reduced to zero.

2. A device as set forth in claim 1 wherein said intermittently interrupting means in an apertured partition disposed adjacent said lens, and means associated with said partition for oscillating said partition across the path of light.

3. A device as set forth in claim 1 wherein said intermittent interruption means is a rotatable apertured disc, and the diameter of each aperture in said disc corresponding to about half the diameter of said objective lens.

4. A device as set forth in claim 1 wherein said intermittent interrupting means is an opaque tongue disposed adjacent said objective lens, and means for oscillating said tongue across the path of light.

5. A device as set forth in claim 1 wherein a second photocell means is disposed in said illuminated portion of said projection plane, said second photocell means being connected in inphase opposition to said first photocell means for absorbing the alternating current which is created by said intermittent interrupting means as a result of the light modulation.

6. A device as set forth in claim 1 wherein said photocell means comprises a pair of measuring photocells and a pair of compensating photocells, and the working voltage of said two pairs of photocells being compared with each other by electronic feed control means.

7. A device as set forth in claim 1 wherein an illumination chamber is disposed on said projection plane, an opal disc covering said illumination chamber, and measuring means being in said illumination chamber.

8. A device as set forth in claim 1 wherein said intermittent interrupting means includes an apertured disc disposed adjacent said objective lens, the apertures in said disc progressively increasing in their diameter, notches in said disc for maintaining a pre-selected aperture concentric with the optical axis of said system, and electromagnetic means for oscillating said disc.

9. A device as set forth in claim 1 in combination with a photographic enlarging apparatus.

10. A device as set forth in claim 1 wherein said means responsive to said current includes sensing means, an electric motor controlled by said sensing means, drive means operated by said electric motor, and said drive means being connected to said objective lens for moving said objective lens when said system is out of focus.

References Cited

UNITED STATES PATENTS

| | | | |
|---|---|---|---|
| 2,747,456 | 5/1956 | Waller et al. | 88—24 |
| 2,968,994 | 1/1961 | Shurcliff | 88—24 |
| 3,037,423 | 6/1962 | Shurcliff | 88—24 |
| 3,249,007 | 5/1966 | Stauffer | 88—24 |

NORTON ANSHER, *Primary Examiner.*

W. A. SIVERTSON, *Assistant Examiner.*